United States Patent
Zhao et al.

(10) Patent No.: US 12,144,017 B2
(45) Date of Patent: Nov. 12, 2024

(54) METHOD AND DEVICE FOR CONFIGURING RADIO BEARER, APPARATUS, AND COMPUTER-READABLE STORAGE MEDIUM

(71) Applicant: DATANG MOBILE COMMUNICATIONS EQUIPMENT CO., LTD., Beijing (CN)

(72) Inventors: Yali Zhao, Beijing (CN); Li Chen, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 499 days.

(21) Appl. No.: 17/442,234

(22) PCT Filed: Mar. 18, 2020

(86) PCT No.: PCT/CN2020/079831
§ 371 (c)(1),
(2) Date: Sep. 23, 2021

(87) PCT Pub. No.: WO2020/192507
PCT Pub. Date: Oct. 1, 2020

(65) Prior Publication Data
US 2022/0191888 A1    Jun. 16, 2022

(30) Foreign Application Priority Data

Mar. 26, 2019   (CN) .......................... 201910231557.9
Jun. 3, 2019    (CN) .......................... 201910476848.4

(51) Int. Cl.
*H04W 72/543*   (2023.01)
*H04W 28/02*    (2009.01)
*H04W 72/1263*  (2023.01)

(52) U.S. Cl.
CPC ..... *H04W 72/543* (2023.01); *H04W 28/0263* (2013.01); *H04W 72/1263* (2013.01)

(58) Field of Classification Search
CPC .......... H04W 72/543; H04W 28/0263; H04W 72/1263
See application file for complete search history.

(56) References Cited

U.S. PATENT DOCUMENTS

2017/0041818 A1   2/2017  Lee et al.
2017/0048922 A1   2/2017  Lee et al.
(Continued)

FOREIGN PATENT DOCUMENTS

CN   107155218 A   9/2017

OTHER PUBLICATIONS

SAMSUNG, "Admission Control in NR Sidelink", Agenda item 11.4.5, 3GPP TSG-RAN WG2 Meeting #105, R2-1901788, Feb. 25-Mar. 1, 2019, Athens, Greece.
(Continued)

*Primary Examiner* — Ajay Cattungal
(74) *Attorney, Agent, or Firm* — Harness, Dickey & Pierce, P.L.C.

(57) ABSTRACT

The present disclosure provides in some embodiments a method and a device for configuring an RB, an apparatus, and a computer-readable storage medium. The method includes receiving a first message transmitted by a network device. The first message at least includes resource allocation information, and the first message is used to configure an SLRB.

16 Claims, 3 Drawing Sheets

(56) References Cited

U.S. PATENT DOCUMENTS

| | | | |
|---|---|---|---|
| 2020/0296694 A1 | 9/2020 | Zhao et al. | |
| 2021/0385694 A1* | 12/2021 | Freda | H04W 28/0289 |
| 2021/0410129 A1* | 12/2021 | Freda | H04W 72/543 |
| 2022/0061055 A1* | 2/2022 | Freda | H04W 72/1263 |
| 2022/0150730 A1* | 5/2022 | Freda | H04L 1/1812 |
| 2022/0191888 A1* | 6/2022 | Zhao | H04W 28/0263 |
| 2023/0370903 A1* | 11/2023 | Freda | H04W 74/0816 |

OTHER PUBLICATIONS

CATT, "Resource Allocation Mode Control", Agenda item 11.4.2.2, 3GPP TSG-RAN Wg2 Meeting #105, R2-1900146, Feb. 25-Mar. 1, 2019, Athens, Greece.
Extended European Search Report dated Apr. 26, 2022 for Application No. EP 20777248.4.
Chinese Office Action dated Jun. 30, 2021 for CN Application No. 201910476848.4.
Huawei, Hisilicon, "TP to TR 38.885 on QoS support for NR V2X", Agenda Item 11.4.5, 3GPP TSG-RAN WG2 Meeting #105, R2-1902500, Feb. 25-Mar. 1, 2019, Athens, Greece.
Written Opinion and International Search Report mailed Jun. 2, 2020 for International Application No. PCT/CN2020/079831.
Huawei, Hisilicon, "Parameter Configuration for D2D Radio Bearers", Agenda Item 7.4.2.2, 3GPP TSG RAN WG2 Meeting #86, R2-142695, May 19-23, 2014, Seoul, Korea.

* cited by examiner receiving a first message transmitted by a network side device, the first message at least including resource allocation information — 101 transmitting a first message to a terminal, the first message at least including resource allocation information — 201

METHOD AND DEVICE FOR CONFIGURING RADIO BEARER, APPARATUS, AND COMPUTER-READABLE STORAGE MEDIUM

CROSS-REFERENCE TO RELATED APPLICATIONS

This application is the U.S. national phase of PCT Application No. PCT/CN2020/079831 filed on Mar. 18, 2020, which claims priorities of the Chinese patent application No. 201910231557.9 filed on Mar. 26, 2019 and the Chinese patent application No. 201910476848.4 filed on Jun. 3, 2019, each of which are incorporated herein by reference in their entireties.

TECHNICAL FIELD

The present disclosure relates to the field of communications technology, in particular to a method and a device for configuring a Radio Bearer (RB), an apparatus, and a computer-readable storage medium.

BACKGROUND

Direct communication is allowed between devices moving close to each other. In order to facilitate the description, a link for direct communication between terminals is called as Sidelink, and a corresponding wireless interface is called as a direct communication interface (also called as Sidelink interface). A cellular communication link between a network and each of the devices for direct communication is called as a Uu link, and a corresponding interface is called as a Uu interface.

The devices for direct communication are all online or offline, or some of the devices are online, and some are offline. The so-called "online" refers to that the devices participating in the direct communication are located within a coverage range of a $3^{rd}$ Generation Partnership Project (3GPP) direct communication carrier, and the so-called "offline" refers to that the devices participating in the direct communication are not within the coverage range of the 3GPP direct communication carrier.

In Long Term Evolution (LTE), the terminal establishes and configures a direct communication interface bearer by itself, and the network completely need not to be involved with those. For an online terminal, when the terminal needs to acquire a direct communication interface resource, it needs to transmit a piece of resource request signaling to a network side again after a Sidelink Radio Bearer (SLRB) has been configured. Hence, in an LTE system, a relatively long time is taken from establishing the bearer to obtaining the resource, and thereby a service transmission delay is adversely affected.

SUMMARY

An object of the present disclosure is to provide a method and a device for configuring an RB, an apparatus and a computer-readable storage medium, so as to reduce the service transmission delay.

In a first aspect, the present disclosure provides in some embodiments a method for configuring an RB applied for a terminal, including receiving a first message transmitted by a network device. The first message at least includes resource allocation information, and the first message is used to configure an SLRB.

In a possible embodiment of the present disclosure, prior to receiving the first message transmitted by the network device in accordance with a second message, the method further includes, in the case that the SLRB needs to be established, transmitting the second message to the network device, and the second message at least includes resource allocation request information.

In a possible embodiment of the present disclosure, prior to transmitting the second message to the network device, the method further includes determining whether the SLRB needs to be established in accordance with an SLRB establishment triggering condition.

In a possible embodiment of the present disclosure, the determining whether the SLRB needs to be established in accordance with the SLRB establishment triggering condition includes, in the case that an access network protocol layer of the terminal has received a data packet corresponding to a high layer Quality of Service (QoS) flow or has received indication information indicating that the high layer QoS flow has arrived, when a mapping between the QoS flow and the SLRB has not been established yet, determining that the SLRB needs to be established.

In a possible embodiment of the present disclosure, the second message includes one or more of identification information of a Sidelink QoS flow, a QoS parameter corresponding to the Sidelink QoS flow, a mapping between the Sidelink QoS flow and a Radio Access Technology (RAT), a service feature corresponding to the Sidelink QoS flow, a transmission mode corresponding to the Sidelink QoS flow, a target identifier corresponding to the Sidelink QoS flow, and a Sidelink frequency point in which the terminal is interested.

In a possible embodiment of the present disclosure, the transmission mode includes any one of unicasting, multicasting and broadcasting.

In a possible embodiment of the present disclosure, the resource allocation information includes one or more of a resource allocation mode corresponding to the SLRB, and configuration information of a preconfigured resource corresponding to the SLRB.

In a possible embodiment of the present disclosure, in the case that the resource allocation information merely includes the resource allocation mode corresponding to the SLRB and the resource allocation mode is a resource allocation mode scheduled by a network, the method further includes: in the case that a triggering condition for reporting auxiliary information of the preconfigured resource has been met, reporting the auxiliary information to the network device; and receiving the configuration information of the preconfigured resource transmitted by the network device.

In a possible embodiment of the present disclosure, the auxiliary information includes a service feature of the SLRB, and the service feature of the SLRB includes one or more of a period, a data packet size, and a data packet arrival time interval.

In a possible embodiment of the present disclosure, the configuration information of the preconfigured resource includes one or more of a type of the preconfigured resource, a Radio Network Temporary Identity (RNTI) corresponding to the preconfigured resource, a period corresponding to the preconfigured resource, a time-domain offset corresponding to the preconfigured resource, a frequency-domain position of the preconfigured resource, and a number of the preconfigured resource.

In a possible embodiment of the present disclosure, the configuration information of the preconfigured resource is configured on the basis of an RAT, a frequency point or a Bandwidth Part (BWP).

In a possible embodiment of the present disclosure, the configuration information of the preconfigured resource is configured through one or more of: carrying indication information of the RAT, the frequency point or the BWP in configuration information of a Semi-Persistent Scheduling (SPS) resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling for the preconfigured resource of the Type 2.

In a possible embodiment of the present disclosure, the first message further includes at least one of an identifier of the SLRB, a target identifier corresponding to a Sidelink QoS flow, a mapping between a QoS flow and the SLRB, a configuration parameter of a Packet Data Convergence Protocol (PDCP) corresponding to the SLRB, a configuration parameter of a Radio Link Control (RLC) corresponding to the SLRB, or a configuration parameter of a Medium Access Control (MAC) corresponding to the SLRB.

In a possible embodiment of the present disclosure, the method further includes, in the case that the first message includes RAT information, taking the RAT information as a restriction parameter for the SLRB when Sidelink interface Logical Channel Prioritization (LCP) is performed.

In a second aspect, the present disclosure provides in some embodiments a method for configuring an RB for a network device, including transmitting a first message to a terminal. The first message at least includes resource allocation information, and the first message is used to configure an SLRB.

In a possible embodiment of the present disclosure, prior to transmitting the first message to the terminal, the method further includes receiving a second message transmitted by the terminal, and the second message at least includes resource allocation request information.

In a possible embodiment of the present disclosure, the second message includes one or more of identification information of a Sidelink QoS flow, a QoS parameter corresponding to the Sidelink QoS flow, a mapping between the Sidelink QoS flow and a Radio Access Technology (RAT), a service feature corresponding to the Sidelink QoS flow, a transmission mode corresponding to the Sidelink QoS flow, a target identifier corresponding to the Sidelink QoS flow, and a Sidelink frequency point in which the terminal is interested.

In a possible embodiment of the present disclosure, the transmission mode includes any one of unicasting, multicasting and broadcasting.

In a possible embodiment of the present disclosure, the resource allocation information includes one or more of a resource allocation mode corresponding to the SLRB, and configuration information of a preconfigured resource corresponding to the SLRB.

In a possible embodiment of the present disclosure, in the case that the resource allocation information merely includes the resource allocation mode corresponding to the SLRB and the resource allocation mode is a resource allocation mode scheduled by a network, the method further includes: receiving auxiliary information transmitted by the terminal; and transmitting the configuration information of the preconfigured resource to the terminal in accordance with the auxiliary information.

In a possible embodiment of the present disclosure, the auxiliary information includes a service feature of the SLRB, and the service feature of the SLRB includes one or more of a period, a data packet size, and a data packet arrival time interval.

In a possible embodiment of the present disclosure, the configuration information of the preconfigured resource includes one or more of a type of the preconfigured resource, a Radio Network Temporary Identity (RNTI) corresponding to the preconfigured resource, a period corresponding to the preconfigured resource, a time-domain offset corresponding to the preconfigured resource, a frequency-domain position of the preconfigured resource, and a number of the preconfigured resource.

In a possible embodiment of the present disclosure, the configuration information of the preconfigured resource is configured on the basis of an RAT, a frequency point or a BWP.

In a possible embodiment of the present disclosure, the configuration information of the preconfigured resource is configured through one or more of: carrying indication information of the RAT, the frequency point or the BWP in configuration information of a Semi-Persistent Scheduling (SPS) resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information about a preconfigured resource of a Type 2 corresponding to the SLRB or activation signaling of the preconfigured resource of the Type 2.

In a possible embodiment of the present disclosure, the first message further includes at least one of an identifier of the SLRB, a target identifier corresponding to a Sidelink QoS flow, a mapping between a QoS flow and the SLRB, a configuration parameter of a Packet Data Convergence Protocol (PDCP) corresponding to the SLRB, a configuration parameter of a Radio Link Control (RLC) corresponding to the SLRB, or a configuration parameter of a Medium Access Control (MAC) corresponding to the SLRB.

In a third aspect, the present disclosure provides in some embodiments a device for configuring an RB for a terminal, including a reception module configured to receive a first message transmitted by a network device. The first message at least includes resource allocation information, and the first message is used to configure an SLRB.

In a possible embodiment of the present disclosure, the device further includes a determination module configured to determine whether the SLRB needs to be established in accordance with an SLRB establishment triggering condition.

In a fourth aspect, the present disclosure provides in some embodiments a device for configuring an RB for a network device, including a transmission module configured to transmit a first message to a terminal. The first message at least includes resource allocation information, and the first message is used to configure an SLRB.

In a possible embodiment of the present disclosure, the resource allocation information includes one or more of a resource allocation mode corresponding to the SLRB, and configuration information of a preconfigured resource corresponding to the SLRB.

In a fifth aspect, the present disclosure provides in some embodiments a communication apparatus for a terminal, including a transceiver, a memory, a processor, and a program stored in the memory and executed by the processor. The transceiver is configured to receive a first message transmitted by a network device. The first message at least includes resource allocation information, and the first message is used to configure an SLRB.

In a possible embodiment of the present disclosure, the transceiver is further configured to, in the case that the SLRB needs to be established, transmit the second message to the network device, and the second message at least includes resource allocation request information.

In a possible embodiment of the present disclosure, the processor is configured to read the program in the memory, so as to determine whether the SLRB needs to be established in accordance with an SLRB establishment triggering condition.

In a possible embodiment of the present disclosure, the processor is further configured to read the program in the memory, so as to, in the case that an access network protocol layer of the terminal has received a first data packet corresponding to a high layer QoS flow or has received indication information indicating that the high layer QoS flow has arrived, when a mapping between the QoS flow and the SLRB has not been established yet, determine that the SLRB needs to be established.

In a possible embodiment of the present disclosure, the second message includes one or more of identification information of a Sidelink QoS flow, a QoS parameter corresponding to the Sidelink QoS flow, a mapping between the Sidelink QoS flow and a Radio Access Technology (RAT), a service feature corresponding to the Sidelink QoS flow, a transmission mode corresponding to the Sidelink QoS flow, a target identifier corresponding to the Sidelink QoS flow, and a Sidelink frequency point in which the terminal is interested.

In a possible embodiment of the present disclosure, the transmission mode includes any one of unicasting, multicasting and broadcasting.

In a possible embodiment of the present disclosure, in the case that the resource allocation information merely includes the resource allocation mode corresponding to the SLRB and the resource allocation mode is a resource allocation mode scheduled by a network, the transceiver is further configured to: in the case that a triggering condition for reporting auxiliary information of the preconfigured resource has been met, report the auxiliary information to the network device; and receive the configuration information of the preconfigured resource transmitted by the network device.

In a possible embodiment of the present disclosure, the auxiliary information includes a service feature of the SLRB, and the service feature of the SLRB includes one or more of a period, a data packet size, and a data packet arrival time interval.

In a possible embodiment of the present disclosure, the configuration information of the preconfigured resource includes one or more of a type of the preconfigured resource, a Radio Network Temporary Identity (RNTI) corresponding to the preconfigured resource, a period corresponding to the preconfigured resource, a time-domain offset corresponding to the preconfigured resource, a frequency-domain position of the preconfigured resource, and a number of the preconfigured resource.

In a possible embodiment of the present disclosure, the configuration information of the preconfigured resource is configured on the basis of an RAT, a frequency point or a BWP.

In a possible embodiment of the present disclosure, the configuration information of the preconfigured resource is configured through one or more of: carrying indication information of the RAT, the frequency point or the BWP in configuration information of a Semi-Persistent Scheduling (SPS) resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information about a preconfigured resource of a Type 2 corresponding to the SLRB or activation signaling of the preconfigured resource of the Type 2.

In a possible embodiment of the present disclosure, the first message further includes at least one of: an identifier of the SLRB, a target identifier corresponding to a Sidelink QoS flow, a mapping between a QoS flow and the SLRB, a configuration parameter of a Packet Data Convergence Protocol (PDCP) corresponding to the SLRB, a configuration parameter of a Radio Link Control (RLC) corresponding to the SLRB, or a configuration parameter of a Medium Access Control (MAC) corresponding to the SLRB.

In a possible embodiment of the present disclosure, the processor is further configured to read the program in the memory, so as to, in the case that the first message includes RAT information, take the RAT information as a restriction parameter for the SLRB when Sidelink interface LCP is performed.

In a sixth aspect, the present disclosure provides in some embodiments a communication apparatus for a network device, including a transceiver, a memory, a processor, and a program stored in the memory and executed by the processor. The transceiver is configured to transmit a first message to a terminal. The first message at least includes resource allocation information, and the first message is used to configure an SLRB.

In a possible embodiment of the present disclosure, the transceiver is further configured to receive a second message transmitted by the terminal, and the second message at least includes resource allocation request information.

In a possible embodiment of the present disclosure, the second message includes one or more of identification information of a Sidelink QoS flow, a QoS parameter corresponding to the Sidelink QoS flow, a mapping between the Sidelink QoS flow and a Radio Access Technology (RAT), a service feature corresponding to the Sidelink QoS flow, a transmission mode corresponding to the Sidelink QoS flow, a target identifier corresponding to the Sidelink QoS flow, and a Sidelink frequency point in which the terminal is interested. The resource allocation information includes one or more of a resource allocation mode corresponding to the SLRB, and configuration information of a preconfigured resource corresponding to the SLRB.

In a possible embodiment of the present disclosure, in the case that the resource allocation information merely includes the resource allocation mode corresponding to the SLRB and the resource allocation mode is a resource allocation mode scheduled by a network, the transceiver is further configured to: receive auxiliary information transmitted by the terminal; and transmit the configuration information of the preconfigured resource to the terminal in accordance with the auxiliary information.

In a possible embodiment of the present disclosure, the auxiliary information includes a service feature of the SLRB, and the service feature of the SLRB includes one or more of a period, a data packet size, and a data packet arrival time interval.

In a possible embodiment of the present disclosure, the configuration information of the preconfigured resource includes one or more of a type of the preconfigured resource, a Radio Network Temporary Identity (RNTI) corresponding to the preconfigured resource, a period corresponding to the preconfigured resource, a time-domain offset corresponding to the preconfigured resource, a frequency-domain position of the preconfigured resource, and a number of the preconfigured resource.

In a possible embodiment of the present disclosure, the configuration information of the preconfigured resource is configured on the basis of an RAT, a frequency point or a BWP.

In a possible embodiment of the present disclosure, the configuration information of the preconfigured resource is configured through one or more of: carrying indication information of the RAT, the frequency point or the BWP in configuration information of a Semi-Persistent Scheduling (SPS) resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information about a preconfigured resource of a Type 2 corresponding to the SLRB or activation signaling of the preconfigured resource of the Type 2.

In a possible embodiment of the present disclosure, the first message further includes at least one of an identifier of the SLRB, a target identifier corresponding to a Sidelink QoS flow, a mapping between a QoS flow and the SLRB, a configuration parameter of a Packet Data Convergence Protocol (PDCP) corresponding to the SLRB, a configuration parameter of a Radio Link Control (RLC) corresponding to the SLRB, or a configuration parameter of a Medium Access Control (MAC) corresponding to the SLRB.

In a seventh aspect, the present disclosure provides in some embodiments a computer-readable storage medium storing therein a computer program. The computer program is executed by a processor so as to implement the steps of the method mentioned in the first aspect or the second aspect.

According to the embodiments of the present disclosure, when the SLRB needs to be established, the first message received by the terminal from the network device at least includes the resource allocation information. A resource for the SLRB is obtained through the first message rather than a separate message, so it is able to reduce a service transmission delay.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figures 1, 2, 3:
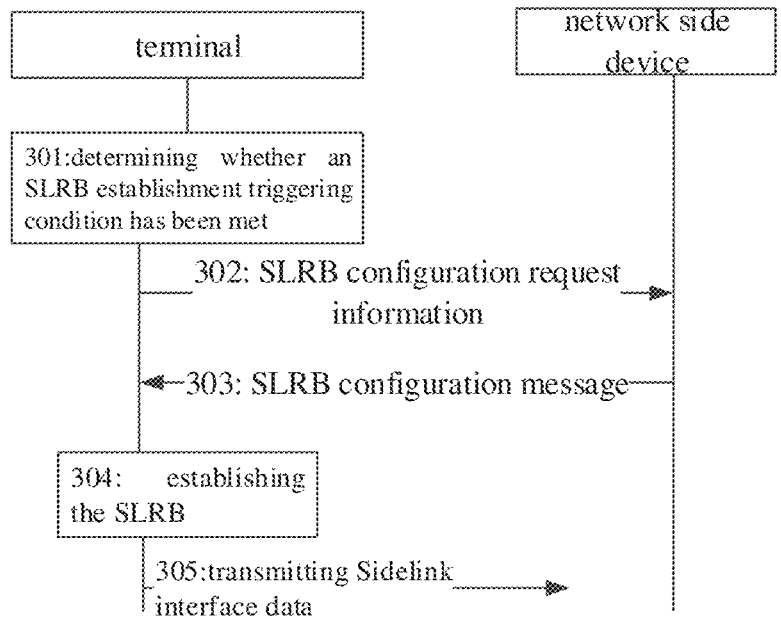
FIG. 1 is a flow chart of a method for configuring an RB according to one embodiment of the present disclosure.
FIG. 2 is another flow chart of the method for configuring the RB according to one embodiment of the present disclosure.
FIG. 3 is yet another flow chart of the method for configuring the RB according to one embodiment of the present disclosure.

The present disclosure provides in some embodiments a method for configuring an RB for a terminal which, as shown in FIG. 1, includes Step 101 of receiving a first message transmitted by a network device. The first message at least includes resource allocation information, and the first message is used to configure an SLRB.

In the embodiments of the present disclosure, a specific form of the first message will not be particularly defined, as long as a same function is capable of being achieved. For example, the first message is an SLRB configuration message, a Radio Resource Control (RRC) connection reconfiguration message, or a message of any other type.

In the embodiments of the present disclosure, the network device transmits, on its own initiative, the first message to the terminal, and the terminal receives the first message transmitted by the network device on its own initiative. Through the first message, the network device configures the SLRB for the terminal.

During the implementation, the network device transmits, on its own initiative, the first message to the terminal through broadcasting or RRC dedicated signaling, and the RRC dedicated signaling is RRC reconfiguration signaling.

The resource allocation information includes one or more of a resource allocation mode corresponding to the SLRB, and configuration information about a preconfigured resource corresponding to the SLRB. The resource allocation mode includes a resource allocation mode scheduled by a network and a resource allocation mode selected by the terminal on its own initiative.

In the case that the resource allocation information merely includes the resource allocation mode corresponding to the SLRB and the resource allocation mode is the resource allocation mode scheduled by the network, when a certain service for the terminal needs to use the preconfigured resource, the method further includes: in the case that a triggering condition for reporting auxiliary information about the preconfigured resource has been met, reporting the auxiliary information to the network device; and receiving the configuration information of the preconfigured resource transmitted by the network device.

The auxiliary information includes a service feature of the SLRB, and the service feature of the SLRB includes one or more of a period, a data packet size, and a data packet arrival time interval.

In the embodiments of the present disclosure, the configuration information of the preconfigured resource includes one or more of: a type of the preconfigured resource, an RNTI corresponding to the preconfigured resource, a period corresponding to the preconfigured resource, a time-domain offset corresponding to the preconfigured resource, a frequency-domain position corresponding to the preconfigured resource, and a number of the preconfigured resource.

The type of the preconfigured resource includes, but not limited to, SPS, a preconfigured resource of a Type 1 and a preconfigured resource of a Type 2.

According to the embodiments of the present disclosure, when the SLRB needs to be established, the first message received by the terminal from the network device at least includes the resource allocation information. A resource of the SLRB is obtained through the first message rather than a separate message, so it is able to reduce a service transmission delay.

In the embodiments of the present disclosure, the network device further transmits the first message to the terminal in response to a request from the terminal. Prior to Step 101, the method further includes, in the case that the SLRB needs to be established, transmitting, by the terminal, a second message to the network device, and the second message at least includes resource allocation request information. Correspondingly, Step 101 specifically includes receiving the first message transmitted by the network device in accordance with the second message. In the embodiments of the present disclosure, a specific form of the second message will not be particularly defined, as long as a same function is capable of being achieved. For example, the second message is an SLRB configuration request message.

In the embodiments of the present disclosure, the second message includes one or more of: identification information of a Sidelink QoS flow, a QoS parameter corresponding to the Sidelink QoS flow (e.g., a Proximity Service (ProSe) QoS Identifier (PQI)), a mapping between the Sidelink QoS flow and an RAT (LTE RAT or New Radio (NR) RAT, which further include RATs with different protocol versions), a service feature corresponding to the Sidelink QoS flow (which includes, but not limited to, a period, a data packet size and a data packet arrival time interval), a transmission mode corresponding to the Sidelink QoS flow, a target Identifier (ID) corresponding to the Sidelink QoS flow, and a Sidelink frequency point in which the terminal is interested (the frequency point is reported on the basis of the terminal or the QoS flow).

The transmission mode includes any one of unicasting, multicasting and broadcasting, and the target identifier includes a destination ID for direct communication.

Based on the above, the terminal also determines whether the SLRB needs to be established in accordance with an SLRB establishment triggering condition. In other words, in the case that the SLRB establishment triggering condition has been met, the establishment of the SLRB is triggered. To be specific, in the case that an access network protocol layer of the terminal has received a first data packet corresponding to a high layer QoS flow or has received indication information indicating that the high layer QoS flow has arrived, when a mapping between the QoS flow and the SLRB has not been established yet, the terminal determines that the SLRB needs to be established.

In the embodiments of the present disclosure, in order to improve the flexibility, the configuration information of the preconfigured resource is configured on the basis of an RAT, a frequency point or a BWP. In other words, the indication information of the RAT, the frequency point or the BWP is carried when indicating the preconfigured resource corresponding to the SLRB.

To be specific, in the embodiments of the present disclosure, the configuration information of the preconfigured resource is configured through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

In addition, the first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB. The target identifier includes a destination ID for direct communication.

In addition, in the embodiments of the present disclosure, the method further includes, in the case that the first message includes RAT information, taking the RAT information as a restriction parameter for the SLRB when Sidelink interface LCP is performed. In other words, during the data transmission via the Sidelink interface, when determining the resource capable of being used by the SLRB, the SLRB is merely allowed to use the resource allocated on the RAT.

The present disclosure further provides in some embodiments a method for configuring an RB for a network device which, as shown in FIG. 2, includes Step 201 of transmitting a first message to a terminal. The first message at least includes resource allocation information.

The resource allocation information includes one or more of: a resource allocation mode corresponding to the SLRB, and configuration information of a preconfigured resource corresponding to the SLRB. The resource allocation mode includes a resource allocation mode scheduled by a network and a resource allocation mode selected by the terminal on its own initiative.

When the network device determines that the SLRB uses the resource allocation mode scheduled by the network and needs to use the preconfigured resource, the network device directly transmits the configuration information of the preconfigured resource corresponding to the SLRB to the terminal.

Alternatively, in the case that the resource allocation information merely includes the resource allocation mode corresponding to the SLRB and the resource allocation mode is the resource allocation mode scheduled by the network, the network device further transmits the configuration information of the preconfigured resource to the terminal in accordance with auxiliary information transmitted from the terminal. At this time, the network device receives the auxiliary information transmitted by the terminal, and transmits the configuration information of the preconfigured resource to the terminal in accordance with the auxiliary information. The auxiliary information includes a service feature of the SLRB, and the service feature of the SLRB includes one or more of a period, a data packet size, and a data packet arrival time interval.

In the embodiments of the present disclosure, the configuration information of the preconfigured resource includes one or more of a type of the preconfigured resource, an RNTI corresponding to the preconfigured resource, a period corresponding to the preconfigured resource, a time-domain offset corresponding to the preconfigured resource, a frequency-domain position corresponding to the preconfigured resource, and an number of the preconfigured resource. The type of the preconfigured resource includes, but not limited to, SPS, a preconfigured resource of a Type 1 and a preconfigured resource of a Type 2.

According to the embodiments of the present disclosure, when the SLRB needs to be established, the first message received by the terminal from the network device at least includes the resource allocation information. A resource of the SLRB is obtained through the first message rather than a separate message, so it is able to reduce a service transmission delay.

In the embodiments of the present disclosure, the network device further transmits the first message to the terminal in response to a request from the terminal. Prior to Step 201, the method further includes receiving a second message from the terminal, and the second message at least includes resource allocation request information. Correspondingly, Step 201 specifically includes transmitting the first message to the terminal in accordance with the second message.

The description about the first message and the second message may refer to that mentioned hereinabove.

In the embodiments of the present disclosure, the second message includes one or more of identification information of a Sidelink QoS flow, a QoS parameter corresponding to the Sidelink QoS flow, a mapping between the Sidelink QoS flow and an RAT, a service feature corresponding to the Sidelink QoS flow, a transmission mode corresponding to the Sidelink QoS flow, a target identifier corresponding to the Sidelink QoS flow, and a Sidelink frequency point in which the terminal is interested. The transmission mode includes any one of unicasting, multicasting and broadcasting, and the target identifier includes a destination ID for direct communication.

In the embodiments of the present disclosure, in order to improve the flexibility, the configuration information of the preconfigured resource is configured on the basis of an RAT, a frequency point or a BWP.

To be specific, in the embodiments of the present disclosure, the configuration information of the preconfigured resource is configured through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

In addition, the first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB. The target identifier includes a destination ID for direct communication.

Different from an LTE system, an NR system would prefer to control, by the network, a configuration of a Sidelink interface bearer, so as to prevent the terminal from increasing a bearer priority arbitrarily for resource preemption. Based on this, the present disclosure provides a scheme for configuring the Sidelink interface bearer, so as to reduce a time between the establishment of the bearer and the obtaining of the resource, thereby to reduce the service transmission delay.

In the embodiments of the present disclosure, the terminal determines whether the SLRB needs to be established in accordance with the SLRB establishment triggering condition, and if yes, transmits the second message to the network device. The second message at least needs to carry the resource allocation request information. The network device receives the second message, and return the first message to the terminal. Through the first message, the SLRB is configured for the terminal. The first message at least needs to carry the resource allocation information.

The specific implementation of the scheme will be described hereinafter in conjunction with the embodiments.

FIG. 3 is a flow chart of the method for configuring the RB according to one embodiment of the present disclosure. In this embodiment of the present disclosure, the network device directly preconfigures the resource while configuring the SLRB. As shown in FIG. 3, the method for configuring the RB includes the following steps.

Step 301: the terminal determines whether the SLRB establishment triggering condition has been met.

The terminal determines whether the SLRB needs to be established in accordance with the SLRB establishment triggering condition. The SLRB establishment triggering condition includes, but not limited to, that the access network protocol layer of the terminal has received the indication information indicating that the high layer QoS flow has arrived or has received the first data packet corresponding to the high layer QoS flow. When a mapping between the QoS flow and the SLRB has not been established yet, the terminal is triggered to transmit an SLRB configuration request message to the network device.

Step 302: the terminal transmits SLRB configuration request information to the network device.

When the SLRB needs to be established as determined in Step 301, the terminal transmits the SLRB configuration request message to the network device, and the SLRB configuration request message at least needs to carry the resource allocation request information.

The SLRB configuration request message at least needs to carry the resource allocation request information. The SLRB configuration request message at least needs to include one of: identification information of a Sidelink QoS flow, a QoS parameter corresponding to the Sidelink QoS flow (e.g., PQI), a mapping between the Sidelink QoS flow and a Radio Access Technology (RAT) (LTE RAT or NA RAT, which further includes RATs with different protocol versions), a service feature corresponding to the Sidelink QoS flow (which includes, but not limited to, a period, a data packet size, and a data packet arrival time interval), a transmission mode corresponding to the Sidelink QoS flow, a target identifier corresponding to the Sidelink QoS flow, and a Sidelink frequency point in which the terminal is interested (the frequency point is reported on the basis of the terminal or the QoS flow).

The transmission mode includes any one of unicasting, multicasting and broadcasting, and the target identifier includes a destination ID for direct communication.

Step 303: the network device transmits an SLRB configuration message to the terminal.

Upon the receipt of the SLRB configuration request message, the network sided device returns the SLRB configuration message to the terminal, and configures the SLRB for the terminal through the SLRB configuration message. The SLRB configuration message at least needs to carry the resource allocation information.

When the network device determines that the SLRB uses the resource allocation mode scheduled by the network and needs to use the preconfigured resource, the resource allocation information at least includes the configuration information of the preconfigured resource corresponding to the SLRB.

The configuration information of the preconfigured resource includes, but not limited to, one or more of: a type of the preconfigured resource (which includes, but not limited to, SPS, a preconfigured resource of a Type 1 and a preconfigured resource of a Type 2), an number of the preconfigured resource, an RNTI corresponding to the preconfigured resource, a period corresponding to the preconfigured resource, a time-domain offset corresponding to the preconfigured resource, and a frequency-domain position corresponding to the preconfigured resource.

Further, the configuration information of the preconfigured resource is configured on the basis of an RAT, a frequency point or a BWP. To be specific, when the network device indicates the preconfigured resource corresponding to the SLRB, the carrying the indication information of the RAT, the frequency point or the BWP includes, but not limited to: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

The SLRB configuration message further carries an SLRB identifier, a target identifier corresponding to a Sidelink QoS flow, a mapping between the QoS flow and the SLRB, and related configuration parameters of a PDCP, an RLC and an MAC corresponding to the SLRB. The target identifier includes a destination ID for direct communication.

Step 304: the terminal establishes the SLRB.

Upon the receipt of the configuration parameter, the terminal establishes the SLRB in accordance with the configuration parameter, and completes a mapping from the QoS flow to the SLRB.

Step 305: the terminal transmits Sidelink interface data.

The terminal transmits data for the SLRB in accordance with the resource allocation mode or preconfigured resource configured at a network side.

When the SLRB configuration message transmitted by the network includes RAT information, the terminal needs to take the RAT information as a restriction parameter for the SLRB when Sidelink interface LCP is performed.

In another possible embodiment of the present disclosure, Steps 301 and 302 are optional, i.e., the method merely includes Steps 304 and 305.

Figure 4:
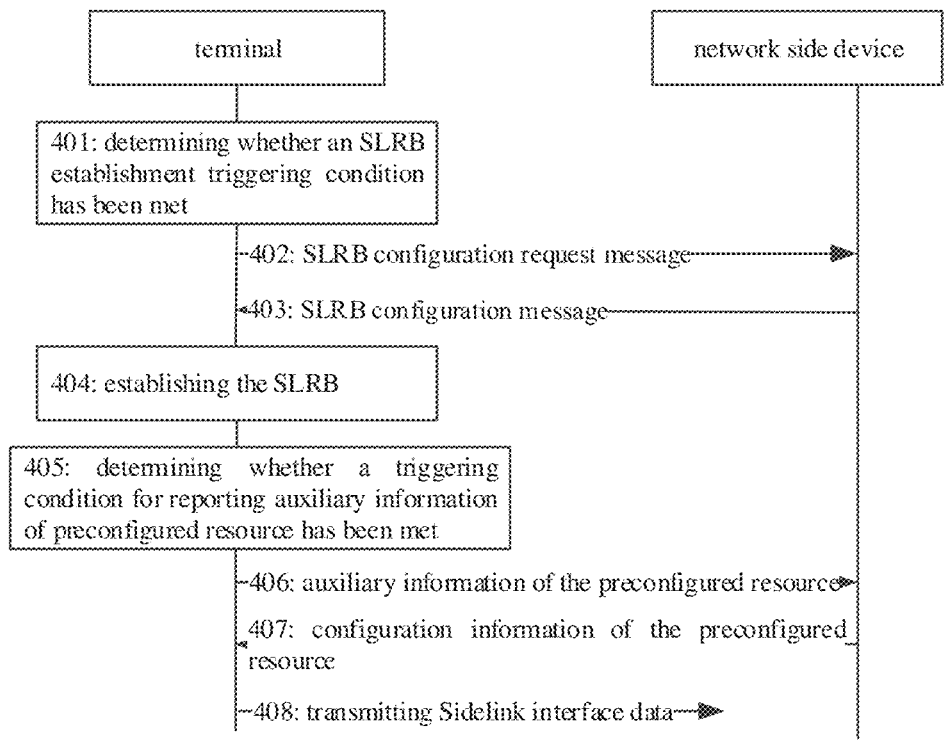
FIG. 4 is still yet another flow chart of the method for configuring the RB according to one embodiment of the present disclosure.

FIG. 4 is a flow chart of the method for configuring the RB according to one embodiment of the present disclosure. In this embodiment of the present disclosure, the network device merely configures the resource allocation mode when configuring the SLRB. As shown in FIG. 4, the method for configuring the RB includes the following steps.

Step 401: the terminal determines whether the SLRB establishment triggering condition has been met.

The terminal determines whether the SLRB needs to be established in accordance with the SLRB establishment triggering condition. The SLRB establishment triggering condition includes, but not limited to, that the access network protocol layer of the terminal has received the indication information indicating that the high layer QoS flow has arrived or has received the first data packet corresponding to the high layer QoS flow. When a mapping between the QoS flow and the SLRB has not been established yet, the terminal is triggered to transmit an SLRB configuration request message to the network device.

Step 402: the terminal transmits SLRB configuration request information to the network device.

When the SLRB needs to be established as determined in Step 401, the terminal transmits the SLRB configuration request message to the network device, and the SLRB configuration request message at least needs to carry the resource allocation request information.

The SLRB configuration request message at least needs to carry the resource allocation request information. The SLRB configuration request message at least needs to include one of: identification information of a Sidelink QoS flow, a QoS parameter corresponding to the Sidelink QoS flow (e.g., PQI), a mapping between the Sidelink QoS flow and a Radio Access Technology (RAT) (LTE RAT or NA RAT, which further includes RATs with different protocol versions), a service feature corresponding to the Sidelink QoS flow (which includes, but not limited to, a period, a data packet size, and a data packet arrival time interval), a transmission mode corresponding to the Sidelink QoS flow, a target identifier corresponding to the Sidelink QoS flow, and a Sidelink frequency point in which the terminal is interested (the frequency point is reported on the basis of the terminal or the QoS flow).

The transmission mode includes any one of unicasting, multicasting and broadcasting, and the target identifier includes a destination ID for direct communication.

Step 403: the network device transmits an SLRB configuration message to the terminal.

Upon the receipt of the SLRB configuration request message, the network sided device returns the SLRB configuration message to the terminal, and configures the SLRB for the terminal through the SLRB configuration message. The SLRB configuration message at least needs to carry the resource allocation information. The resource allocation information includes the resource allocation mode corresponding to the SLRB.

Further, the resource allocation information is configured on the basis of an RAT, a frequency point or a BWP.

The SLRB configuration message further carries an SLRB identifier, a target identifier corresponding to a Sidelink QoS flow, a mapping between the QoS flow and the SLRB, and related configuration parameters of a PDCP, an RLC and an MAC corresponding to the SLRB. The target identifier includes a destination ID for direct communication.

Step 404: the terminal establishes the SLRB.

Upon the receipt of the configuration parameter, the terminal establishes the SLRB in accordance with the configuration parameter, and completes a mapping from the QoS flow to the SLRB.

Step 405: the terminal determines whether a triggering condition for reporting auxiliary information of the preconfigured resource has been met.

This step is optional. Steps 405 to 407 need to be performed merely when a certain service for the terminal needs to use the preconfigured resource.

In the case that the resource allocation information in Step 403 includes the resource allocation mode corresponding to the SLRB and the resource allocation mode configured by the network device for the terminal is a resource allocation mode scheduled by a network, when a certain service for the terminal needs to use the preconfigured resource, the terminal determines that the triggering condition for reporting the auxiliary information of the preconfigured resource has been met. The terminal needs to further transmit the auxiliary information to the network device.

Step 406: the terminal reports the auxiliary information of the preconfigured resource to the network device.

This step is optional. The auxiliary information at least includes, but not limited to, a service feature of the SLRB, and the service feature of the SLRB includes, but not limited to, a period, a data packet size, and a data packet arrival time interval.

Step 407: the network device transmits the configuration information of the preconfigured resource to the terminal.

This step is optional. Upon the receipt of the auxiliary information, the network device further configures the preconfigured resource for the terminal. The configuration information of the preconfigured resource includes, but not limited to, one or more of a type of the preconfigured resource (which includes, but not limited to, SPS, a preconfigured resource of a Type 1 and a preconfigured resource of a Type 2), a number of the preconfigured resource, an RNTI corresponding to the preconfigured resource, a period corresponding to the preconfigured resource, a time-domain offset corresponding to the preconfigured resource, a frequency-domain offset corresponding to the preconfigured resource, and a time/frequency-domain resource position corresponding to the preconfigured resource.

The indication information of the RAT, the frequency point or the BWP corresponding to preconfigured resource includes, but not limited to: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

Step 408: the terminal transmits Sidelink interface data.

The terminal transmits data for the SLRB in accordance with the resource allocation mode or preconfigured resource configured at a network side.

When the SLRB configuration message transmitted by the network includes RAT information, the terminal needs to take the RAT information as a restriction parameter for the SLRB when Sidelink interface LCP is performed.

In another possible embodiment of the present disclosure, Steps 401 and 402 are optional.

Based on the above-mentioned scheme, according to the embodiments of the present disclosure, it is able to reduce a time between the establishment of the bearer and the obtaining of the resource, thereby to reduce the service transmission delay.

Figure 5:
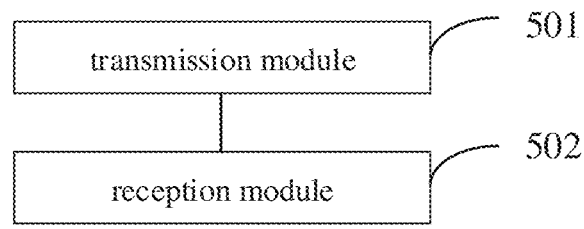
FIG. 5 is a schematic view showing a device for configuring an RB according to one embodiment of the present disclosure.

The present disclosure further provides in some embodiments a device for configuring an RB for a terminal which, as shown in FIG. 5, includes a reception module 501 configured to receive a first message transmitted by a network device. The first message at least includes resource allocation information, and the first message is used to configure an SLRB.

In a possible embodiment of the present disclosure, the device further includes a transmission module 502 configured to, in the case that the SLRB needs to be established, transmit a second message to the network device, and the second message at least includes resource allocation request information.

In a possible embodiment of the present disclosure, the device further includes a determination module 503 configured to determine whether the SLRB needs to be established in accordance with an SLRB establishment triggering condition. The determination module is specifically configured to, in the case that an access network protocol layer of the terminal has received a first data packet corresponding to a high layer QoS flow or has received indication information indicating that the high layer QoS flow has arrived, when a mapping between the QoS flow and the SLRB has not been established yet, determine that the SLRB needs to be established.

In a possible embodiment of the present disclosure, the second message includes one or more of identification information of a Sidelink QoS flow, a QoS parameter corresponding to the Sidelink QoS flow, a mapping between the Sidelink QoS flow and an RAT, a service feature corresponding to the Sidelink QoS flow, a transmission mode corresponding to the Sidelink QoS flow, a target identifier corresponding to the Sidelink QoS flow, and a Sidelink frequency point in which the terminal is interested.

In a possible embodiment of the present disclosure, the resource allocation information includes one or more of a resource allocation mode corresponding to the SLRB, and configuration information of a preconfigured resource corresponding to the SLRB.

In a possible embodiment of the present disclosure, the device further includes a reporting module 505 configured to, in the case that the resource allocation information merely includes the resource allocation mode corresponding to the SLRB and the resource allocation mode is a resource allocation mode scheduled by a network and in the case that a triggering condition for reporting auxiliary information of the preconfigured resource has been met, report the auxiliary information to the network device. The reception module 502 is further configured to receive the configuration information of the preconfigured resource transmitted by the network device.

In a possible embodiment of the present disclosure, the auxiliary information includes a service feature of the SLRB, and the service feature of the SLRB includes one or more of a period, a data packet size, and a data packet arrival time interval.

In a possible embodiment of the present disclosure, the configuration information of the preconfigured resource includes one or more of a type of the preconfigured resource, a period corresponding to the preconfigured resource, a time-domain offset corresponding to the preconfigured resource, a frequency-domain position corresponding to the preconfigured resource, and a number of the preconfigured resource.

In a possible embodiment of the present disclosure, the configuration information of the preconfigured resource is configured on the basis of an RAT, a frequency point or a BWP.

In actual use, the configuration information of the preconfigured resource is configured through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

In addition, the first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB.

In the embodiments of the present disclosure, a working principle of the device may refer to the description in the above-mentioned method embodiments.

In the embodiments of the present disclosure, the terminal determines whether the SLRB needs to be established in accordance with the SLRB establishment triggering condition, and if yes, transmits the second message to the network device. The second message at least needs to carry the resource allocation request information. The network device receives the second message, and return the first message to the terminal. Through the first message, the SLRB is configured for the terminal. The first message at least needs to carry the resource allocation information.

Figure 6:
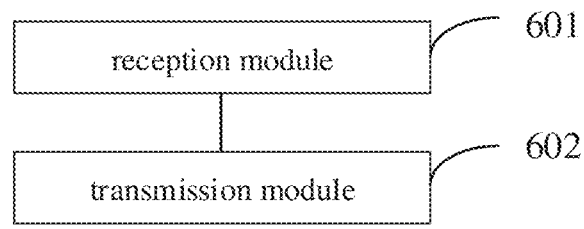
FIG. 6 is another schematic view showing the device for configuring the RB according to one embodiment of the present disclosure.

The present disclosure further provides in some embodiments a device for configuring an RB for a network device which, as shown in FIG. 6, includes a transmission module 601 configured to transmit a first message to a terminal. The first message at least includes resource allocation information.

In a possible embodiment of the present disclosure, the device further includes a reception module 602 configured to receive a second message transmitted by the terminal, and the second message at least includes resource allocation request information.

In a possible embodiment of the present disclosure, the second message includes one or more of identification information of a Sidelink QoS flow, a QoS parameter corresponding to the Sidelink QoS flow, a mapping between the Sidelink QoS flow and an RAT, a service feature corresponding to the Sidelink QoS flow, a transmission mode corresponding to the Sidelink QoS flow, a target identifier corresponding to the Sidelink QoS flow, and a Sidelink frequency point in which the terminal is interested.

In a possible embodiment of the present disclosure, the resource allocation information includes one or more of a resource allocation mode corresponding to the SLRB, and configuration information of a preconfigured resource corresponding to the SLRB.

In a possible embodiment of the present disclosure, the reception module 601 is further configured to, in the case that the resource allocation information merely includes the resource allocation mode corresponding to the SLRB and the resource allocation mode is a resource allocation mode scheduled by a network, receive auxiliary information transmitted by the terminal. The transmission module 602 is further configured to transmit the configuration information of the preconfigured resource to the terminal in accordance with the auxiliary information.

The auxiliary information includes a service feature of the SLRB, and the service feature of the SLRB includes one or more of a period, a data packet size, and a data packet arrival time interval.

In a possible embodiment of the present disclosure, the configuration information of the preconfigured resource includes one or more of a type of the preconfigured resource, an RNTI corresponding to the preconfigured resource, a period corresponding to the preconfigured resource, a time-domain offset corresponding to the preconfigured resource, a frequency-domain position corresponding to the preconfigured resource, and a number of the preconfigured resource.

In a possible embodiment of the present disclosure, the configuration information of the preconfigured resource is configured on the basis of an RAT, a frequency point or a BWP.

In a possible embodiment of the present disclosure, the configuration information of the preconfigured resource is configured through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

In a possible embodiment of the present disclosure, the first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB.

In the embodiments of the present disclosure, a working principle of the device may refer to the description in the above-mentioned method embodiments.

In the embodiments of the present disclosure, the terminal determines whether the SLRB needs to be established in accordance with the SLRB establishment triggering condition, and if ye, transmits the second message to the network device. The second message at least needs to carry the resource allocation request information. The network device receives the second message, and return the first message to the terminal. Through the first message, the SLRB is configured for the terminal. The first message at least needs to carry the resource allocation information.

Figure 7:
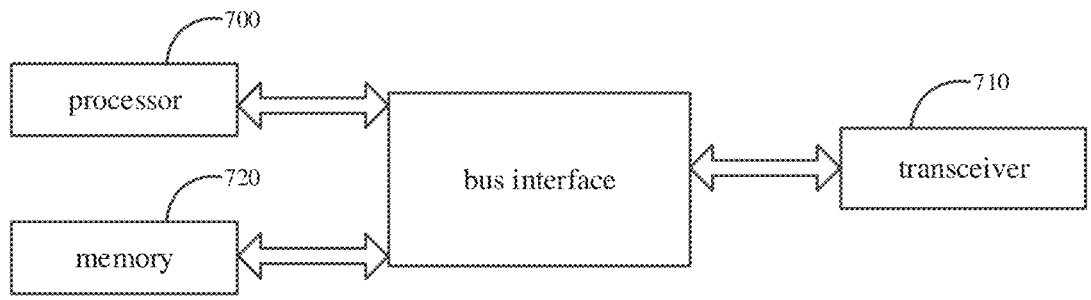
FIG. 7 is a schematic view showing a network device according to one embodiment of the present disclosure.

As shown in FIG. 7, the present disclosure provides in some embodiments a network device, which includes a processor 700, and a transceiver 710 configured to transmit a first message to a terminal. The first message at least includes resource allocation information.

In FIG. 7, bus architecture includes a number of buses and bridges connected to each other, so as to connect various circuits for one or more processors 700 and one or more memories 720. In addition, as is known in the art, the bus architecture is used to connect any other circuits, such as a circuit for a peripheral device, a circuit for a voltage stabilizer and a power management circuit. A bus interface is provided, and the transceiver 710 consists of a plurality of elements, i.e., a transmitter and a receiver for communication with any other devices over a transmission medium.

The processor 700 takes charge of managing the bus architecture as well as general processings. The memory 720 stores therein data for the operation of the processor 700.

The transceiver 710 is further configured to receive a second message transmitted by the terminal, and the second message at least includes resource allocation request information.

The second message includes one or more of identification information of a Sidelink QoS flow, a QoS parameter corresponding to the Sidelink QoS flow, a mapping between the Sidelink QoS flow and an RAT, a service feature corresponding to the Sidelink QoS flow, a transmission mode corresponding to the Sidelink QoS flow, a target identifier corresponding to the Sidelink QoS flow, and a Sidelink frequency point in which the terminal is interested. The transmission mode includes any one of unicasting, multicasting and broadcasting, and the target identifier includes a destination ID for direct communication.

The resource allocation information includes one or more of a resource allocation mode corresponding to the SLRB, and configuration information of a preconfigured resource corresponding to the SLRB.

In the case that the resource allocation information merely includes the resource allocation mode corresponding to the SLRB and the resource allocation mode is a resource allocation mode scheduled by a network, the transceiver 710 is further configured to: receive auxiliary information transmitted by the terminal; and transmit the configuration information of the preconfigured resource to the terminal in accordance with the auxiliary information.

The auxiliary information includes a service feature of the SLRB, and the service feature of the SLRB includes one or more of a period, a data packet size, and a data packet arrival time interval.

The configuration information of the preconfigured resource includes one or more of a type of the preconfigured resource, an RNTI corresponding to the preconfigured resource, a period corresponding to the preconfigured resource, a time-domain offset corresponding to the preconfigured resource, a frequency-domain position corresponding to the preconfigured resource, and a number of the preconfigured resource.

The configuration information of the preconfigured resource is configured on the basis of an RAT, a frequency point or a BWP.

The processor 710 is configured to read a program stored in the memory, so as to configure the configuration information of the preconfigured resource through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

The first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB.

Figure 8:
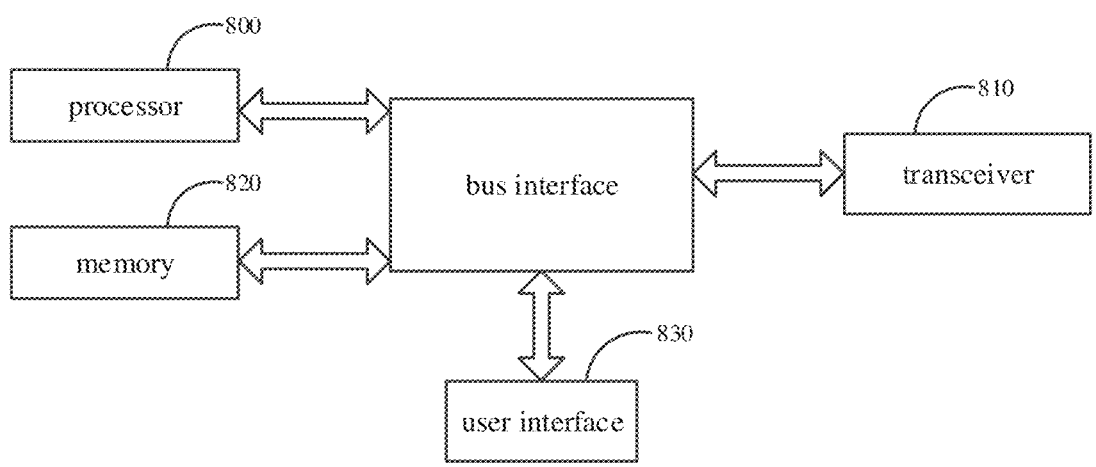
FIG. 8 is a schematic view showing a terminal according to one embodiment of the present disclosure.

As shown in FIG. 8, the present disclosure further provides in some embodiments a terminal, which includes a processor 800, and a transceiver 810 configured to receive a first message transmitted by a network device. The first message at least includes resource allocation information.

In FIG. 8, bus architecture includes a number of buses and bridges connected to each other, so as to connect various circuits for one or more processors 800 and one or more memories 820. In addition, as is known in the art, the bus architecture is used to connect any other circuits, such as a circuit for a peripheral device, a circuit for a voltage stabilizer and a power management circuit. A bus interface is provided, and the transceiver 810 consists of a plurality of elements, i.e., a transmitter and a receiver for communication with any other devices over a transmission medium. With respect to different User Equipments (UEs), a user interface 830 is also provided for devices which are to be arranged inside or outside the UE, and these devices include, but not limited to, a keypad, a display, a speaker, a microphone and a joystick.

The processor 800 takes charge of managing the bus architecture as well as general processings. The memory 820 stores therein data for the operation of the processor 800.

The transceiver is further configured to, in the case that the SLRB needs to be established, transmit the second message to the network device, and the second message at least includes resource allocation request information.

The processor 800 is further configured to read a computer program, so as to determine whether the SLRB needs to be established in accordance with an SLRB establishment triggering condition.

The processor 800 is further configured to read the computer program, so as to, in the case that an access network protocol layer of the terminal has received a first data packet corresponding to a high layer QoS flow or has received indication information indicating that the high layer QoS flow has arrived, when a mapping between the QoS flow and the SLRB has not been established yet, determine that the SLRB needs to be established.

The second message includes one or more of identification information of a Sidelink QoS flow, a QoS parameter corresponding to the Sidelink QoS flow, a mapping between the Sidelink QoS flow and an RAT, a service feature corresponding to the Sidelink QoS flow, a transmission mode corresponding to the Sidelink QoS flow, a target identifier corresponding to the Sidelink QoS flow, and a Sidelink frequency point in which the terminal is interested.

The resource allocation information includes one or more of a resource allocation mode corresponding to the SLRB, and configuration information of a preconfigured resource corresponding to the SLRB.

In the case that the resource allocation information merely includes the resource allocation mode corresponding to the SLRB and the resource allocation mode is a resource allocation mode scheduled by a network, the transceiver is further configured to: in the case that a triggering condition for reporting auxiliary information of the preconfigured resource has been met, report the auxiliary information to the network device; and receive the configuration information of the preconfigured resource transmitted by the network device.

The auxiliary information includes a service feature of the SLRB, and the service feature of the SLRB includes one or more of a period, a data packet size, and a data packet arrival time interval.

The configuration information of the preconfigured resource includes one or more of a type of the preconfigured resource, an RNTI corresponding to the preconfigured resource, a period corresponding to the preconfigured resource, a time-domain offset corresponding to the preconfigured resource, a frequency-domain position corresponding to the preconfigured resource, and a number of the preconfigured resource.

The configuration information of the preconfigured resource is configured on the basis of an RAT, a frequency point or a BWP.

The configuration information of the preconfigured resource is configured through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

The first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB.

The processor 800 is further configured to read the computer program, so as to, in the case that the first message includes RAT information, take the RAT information as a restriction parameter for the SLRB when Sidelink interface LCP is performed.

The present disclosure further provides in some embodiments a computer-readable storage medium storing therein a computer program. The computer program is executed by a processor, so as to receive a first message transmitted by a network device. The first message at least includes resource allocation information.

Prior to receiving the first message transmitted by the network device in accordance with a second message, the processor is further configured to, in the case that the SLRB needs to be established, transmit the second message to the network device, and the second message at least includes resource allocation request information.

Prior to transmitting the second message to the network device, the processor is further configured to determine whether the SLRB needs to be established in accordance with an SLRB establishment triggering condition.

The determining whether the SLRB needs to be established in accordance with the SLRB establishment triggering condition includes, in the case that an access network protocol layer of the terminal has received a first data packet corresponding to a high layer QoS flow or has received indication information indicating that the high layer QoS flow has arrived, when a mapping between the QoS flow and the SLRB has not been established yet, determining that the SLRB needs to be established.

The second message includes one or more of identification information of a Sidelink QoS flow, a QoS parameter corresponding to the Sidelink QoS flow, a mapping between the Sidelink QoS flow and an RAT, a service feature corresponding to the Sidelink QoS flow, a transmission mode corresponding to the Sidelink QoS flow, a target identifier corresponding to the Sidelink QoS flow, and a Sidelink frequency point in which the terminal is interested.

The resource allocation information includes one or more of a resource allocation mode corresponding to the SLRB, and configuration information of a preconfigured resource corresponding to the SLRB.

In the case that the resource allocation information merely includes the resource allocation mode corresponding to the SLRB and the resource allocation mode is a resource allocation mode scheduled by a network, the processor is further configured to: in the case that a triggering condition for reporting auxiliary information of the preconfigured resource has been met, report the auxiliary information to the network device; and receive the configuration information of the preconfigured resource transmitted by the network device.

The auxiliary information includes a service feature of the SLRB, and the service feature of the SLRB includes one or more of a period, a data packet size, and a data packet arrival time interval.

The configuration information of the preconfigured resource includes one or more of a type of the preconfigured resource, an RNTI corresponding to the preconfigured resource, a period corresponding to the preconfigured resource, a time-domain offset corresponding to the preconfigured resource, a frequency-domain position corresponding to the preconfigured resource, and a number of the preconfigured resource.

The configuration information of the preconfigured resource is configured on the basis of an RAT, a frequency point or a BWP.

The configuration information of the preconfigured resource is configured through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

The first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB.

The present disclosure further provides in some embodiments a computer-readable storage medium storing therein a computer program. The computer program is executed by a processor so as to transmit a first message to a terminal. The first message at least includes resource allocation information.

Prior to transmitting the first message to the terminal, the processor is further configured to receive a second message transmitted by the terminal, and the second message at least includes resource allocation request information.

The second message includes one or more of identification information of a Sidelink QoS flow, a QoS parameter corresponding to the Sidelink QoS flow, a mapping between the Sidelink QoS flow and an RAT, a service feature corresponding to the Sidelink QoS flow, a transmission mode corresponding to the Sidelink QoS flow, a target identifier corresponding to the Sidelink QoS flow, and a Sidelink frequency point in which the terminal is interested.

The resource allocation information includes one or more of a resource allocation mode corresponding to the SLRB, and configuration information of a preconfigured resource corresponding to the SLRB.

In the case that the resource allocation information merely includes the resource allocation mode corresponding to the SLRB and the resource allocation mode is a resource allocation mode scheduled by a network, the processor is further configured to: receive auxiliary information transmitted by the terminal; and transmit the configuration information of the preconfigured resource to the terminal in accordance with the auxiliary information.

The auxiliary information includes a service feature of the SLRB, and the service feature of the SLRB includes one or more of a period, a data packet size, and a data packet arrival time interval.

The configuration information of the preconfigured resource includes one or more of a type of the preconfigured resource, an RNTI corresponding to the preconfigured resource, a period corresponding to the preconfigured resource, a time-domain offset corresponding to the preconfigured resource, a frequency-domain position corresponding to the preconfigured resource, and a number of the preconfigured resource.

The configuration information of the preconfigured resource is configured on the basis of an RAT, a frequency point or a BWP.

The configuration information of the preconfigured resource is configured through one or more of: carrying indication information of the RAT, the frequency point or the BWP in configuration information of an SPS resource corresponding to the SLRB or SPS activation signaling; carrying the indication information of the RAT, the frequency point or the BWP in configuration information of a preconfigured resource of a Type 1 corresponding to the SLRB; and carrying the indication information of the RAT, the frequency point or the BWP in configuration information of a preconfigured resource of a Type 2 corresponding to the SLRB or activation signaling of the preconfigured resource of the Type 2.

The first message further includes at least one of an identifier of the SLRB, a target identifier corresponding to a Sidelink QoS flow, a mapping between a QoS flow and the SLRB, a configuration parameter of a PDCP corresponding to the SLRB, a configuration parameter of an RLC corresponding to the SLRB, or a configuration parameter of an MAC corresponding to the SLRB.

The processor is further configured to, in the case that the first message includes RAT information, take the RAT information as a restriction parameter for the SLRB when Sidelink interface LCP is performed.

It should be appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, units and steps described in the embodiments of the present disclosure are implemented in the form of electronic hardware, or a combination of a computer program and the electronic hardware. Whether or not these functions are executed by hardware or software depends on specific applications or design constraints of the technical solution. Different methods are adopted with respect to the specific applications so as to achieve the described functions, without departing from the scope of the present disclosure.

It should be further appreciated that, for convenience and clarification, operation procedures of the system, device and units described hereinabove refer to the corresponding procedures in the method embodiment, and thus will not be particularly defined herein.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a USB flash disk, a mobile HD, an ROM, an RAM, a magnetic disk or an optical disk.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure may be implemented by hardware, software, firmware, middleware, microcode or a combination thereof. For the hardware implementation, the processor may include one or more of an Application Specific Integrated Circuits (ASIC), a Digital Signal Processor (DSP), a DSP device (DSPD), a Programmable Logic Device (PLD), a Field-Programmable Gate Array (FPGA_, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for configuring a Radio Bearer (RB), applied for a terminal, comprising receiving a first message transmitted by a network device, wherein the first message at least comprises resource allocation information, and the first message is used to configure a Sidelink Radio Bearer (SLRB);
    wherein prior to receiving the first message transmitted by the network device, the method further comprises, transmitting a second message to the network device, wherein the second message at least comprises resource allocation request information;
    wherein prior to transmitting the second message to the network device, the method further comprises determining whether the SLRB needs to be established in accordance with an SLRB establishment triggering condition;
    wherein the determining whether the SLRB needs to be established in accordance with the SLRB establishment triggering condition comprises, in the case that an access network protocol layer of the terminal has received a data packet corresponding to a high layer Quality of Service (QoS) flow or has received indication information indicating that the high layer QoS flow has arrived, when a mapping between the QoS flow and the SLRB has not been established yet, determining that the SLRB needs to be established.

2. The method according to claim 1, wherein the second message comprises one or more of:
    identification information of a Sidelink QoS flow,
    a QoS parameter corresponding to the Sidelink QoS flow,
    a mapping between the Sidelink QoS flow and a Radio Access Technology (RAT),
    a service feature corresponding to the Sidelink QoS flow,
    a transmission mode corresponding to the Sidelink QoS flow,
    a target identifier corresponding to the Sidelink QoS flow, and
    a Sidelink frequency point in which the terminal is interested.

3. The method according to claim 2, wherein the transmission mode comprises any one of unicasting, multicasting and broadcasting.

4. The method according to claim 1, wherein the resource allocation information comprises one or more of a resource allocation mode corresponding to the SLRB, and configuration information of a preconfigured resource corresponding to the SLRB.

5. The method according to claim 4, wherein in the case that the resource allocation information merely comprises the resource allocation mode corresponding to the SLRB and the resource allocation mode is a resource allocation mode scheduled by a network, the method further comprises:
    in the case that a triggering condition for reporting auxiliary information of the preconfigured resource has been met, reporting the auxiliary information to the network device; and
    receiving the configuration information of the preconfigured resource transmitted by the network device.

6. The method according to claim 5, wherein the auxiliary information comprises a service feature of the SLRB, and the service feature of the SLRB comprises one or more of a period, a data packet size, and a data packet arrival time interval.

7. The method according to claim 4, wherein the first message further comprises at least one of:
    an identifier of the SLRB,
    a target identifier corresponding to a Sidelink QoS flow,
    a mapping between a QoS flow and the SLRB,
    a configuration parameter of a Packet Data Convergence Protocol (PDCP) corresponding to the SLRB,
    a configuration parameter of a Radio Link Control (RLC) corresponding to the SLRB, or
    a configuration parameter of a Medium Access Control (MAC) corresponding to the SLRB.

8. The method according to claim 4, wherein the configuration information of the preconfigured resource comprises one or more of:
    a type of the preconfigured resource,
    a Radio Network Temporary Identity (RNTI) corresponding to the preconfigured resource,
    a period corresponding to the preconfigured resource,
    a time-domain offset corresponding to the preconfigured resource,
    a frequency-domain position of the preconfigured resource, and
    a number of the preconfigured resource.

9. The method according to claim 8, wherein the configuration information of the preconfigured resource is configured on the basis of an RAT, or
    the configuration information of the preconfigured resource is configured on the basis of a frequency point, or
    the configuration information of the preconfigured resource is configured on the basis of a Bandwidth Part (BWP).

10. The method according to claim 9, wherein the configuration information of the preconfigured resource is configured through one or more of:
    carrying indication information of the RAT, the frequency point or the BWP in configuration information of a Semi-Persistent Scheduling (SPS) resource corresponding to the SLRB or SPS activation signaling;

carrying the indication information of the RAT, the frequency point or the BWP in configuration information of a preconfigured resource of a Type 1 corresponding to the SLRB; and carrying the indication information of the RAT, the frequency point or the BWP in configuration information about a preconfigured resource of a Type 2 corresponding to the SLRB or activation signaling of the preconfigured resource of the Type 2.

11. The method according to claim 10, further comprising, in the case that the first message comprises RAT information, taking the RAT information as a restriction parameter for the SLRB when Sidelink interface Logical Channel Prioritization (LCP) is performed.

12. A method for configuring a Radio Bearer (RB), applied for a network device, comprising:

transmitting a first message to a terminal, wherein the first message at least comprises resource allocation information, and the first message is used to configure a Sidelink Radio Bearer (SLRB);

wherein prior to transmitting the first message to the terminal, the method further comprises:

receiving a second message transmitted by the terminal, wherein the second message at least comprises resource allocation request information;

wherein the terminal determines whether the SLRB needs to be established in accordance with an SLRB establishment triggering condition, comprising:

determining whether the SLRB needs to be established in accordance with the SLRB establishment triggering condition comprises, in the case that an access network protocol layer of the terminal has received a data packet corresponding to a high layer Quality of Service (QoS) flow or has received indication information indicating that the high layer QoS flow has arrived, when a mapping between the QoS flow and the SLRB has not been established yet, determining that the SLRB needs to be established.

13. The method according to claim 12, wherein the second message comprises one or more of:

identification information of a Sidelink QoS flow, a QoS parameter corresponding to the Sidelink QoS flow, a mapping between the Sidelink QoS flow and a Radio Access Technology (RAT), a service feature corresponding to the Sidelink QoS flow, a transmission mode corresponding to the Sidelink QoS flow, a target identifier corresponding to the Sidelink QoS flow, and a Sidelink frequency point in which the terminal is interested.

14. The method according to claim 13, wherein the transmission mode comprises any one of unicasting, multicasting and broadcasting.

15. A communication apparatus, applied for a network device, comprising a transceiver, a memory, a processor, and a program stored in the memory and executed by the processor to implement the method for configuring a Radio Bearer (RB) according to claim 12.

16. A communication apparatus, applied for a terminal, comprising a transceiver, a memory, a processor, and a program stored in the memory and executed by the processor, wherein the transceiver is configured to receive a first message transmitted by a network device, the first message at least comprises resource allocation information, and the first message is used to configure a Sidelink Radio Bearer (SLRB);

wherein the transceiver is further configured to, in the case that the SLRB needs to be established, transmit the second message to the network device, wherein the second message at least comprises resource allocation request information;

wherein the processor is configured to read the program in the memory, so as to determine whether the SLRB needs to be established in accordance with an SLRB establishment triggering condition;

wherein the processor is further configured to read the program in the memory, so as to, in the case that an access network protocol layer of the terminal has received a first data packet corresponding to a high layer Quality of Service (QoS) flow or has received indication information indicating that the high layer QoS flow has arrived, when a mapping between the QoS flow and the SLRB has not been established yet, determine that the SLRB needs to be established.

* * * * *